United States Patent
Seder et al.

(10) Patent No.: US 11,523,091 B2
(45) Date of Patent: Dec. 6, 2022

(54) HEAD UP DISPLAY IMAGE BLUR COMPENSATION

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/231,707

(22) Filed: Apr. 15, 2021

(65) Prior Publication Data

US 2022/0337791 A1 Oct. 20, 2022

(51) Int. Cl.
| | | |
|---|---|---|
| G06F 3/045 | (2006.01) | |
| G06F 3/041 | (2006.01) | |
| H04N 9/31 | (2006.01) | |
| G02B 27/01 | (2006.01) | |

(52) U.S. Cl.
CPC ......... *H04N 9/312* (2013.01); *G02B 27/0101* (2013.01); *H04N 9/3161* (2013.01)

(58) Field of Classification Search
CPC .................................................. G02B 27/01
See application file for complete search history.

(56) References Cited

U.S. PATENT DOCUMENTS

| | | | |
|---|---|---|---|
| 10,880,529 B2 | 12/2020 | Chang et al. | |
| 2017/0138545 A1* | 5/2017 | Minor | G02B 26/0833 |
| 2017/0269365 A1* | 9/2017 | Fujita | B60K 37/06 |

OTHER PUBLICATIONS

U.S. Appl. No. 17/004,249, filed Aug. 27, 2020, Seder et al.
Kubota S, Goodman J. Very efficient speckle contrast reduction realized by moving diffuser device. Appl. Opt. 2010; 49(23): 4385-4391.
Publication titled "Optical Speckle Mitigation"—Disclosed Anonymously in Research Disclosure; digital publication: Jan. 22, 2021; paper publication: Feb. 2021; Questel Ireland Ltd, Killernan, Kilmaine, County Mayo, Ireland.

* cited by examiner

*Primary Examiner* — Nan-Ying Yang
(74) *Attorney, Agent, or Firm* — Harness, Dickey & Pierce, P.L.C.

(57) ABSTRACT

A head up display (HUD) system includes: a laser; a liquid crystal on silicon (LCoS) panel configured to modulate light output by the laser; a modulator control module configured to, during each predetermined period: apply power to the LCoS panel for a first predetermined ON period; and disconnect the LCoS panel from power for a remainder of the predetermined period; and a laser control module configured to, during each predetermined period: when a temperature of the LCoS panel is less than a predetermined temperature: apply power to the laser for a second predetermined ON period while power is applied to the LCoS panel and after the modulator control module begins applying power to the LCoS panel, where the second predetermined ON period is less than the first predetermined ON period; and disconnect the laser from power for the remainder of the predetermined period.

20 Claims, 8 Drawing Sheets

HEAD UP DISPLAY IMAGE BLUR COMPENSATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display systems and methods for vehicles and more particularly to head up display systems of vehicles.

A driver of a vehicle traditionally views surroundings of a vehicle through windows, windshields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information by forming a virtual image at a certain distance with reflection of a windshield. For example, the HUD may display a vehicle speed and other vehicle information.

SUMMARY

In a feature, a head up display (HUD) system includes: a laser; a liquid crystal on silicon (LCoS) panel configured to modulate light output by the laser; a modulator control module configured to, during each predetermined period: apply power to the LCoS panel for a first predetermined ON period; and disconnect the LCoS panel from power for a remainder of the predetermined period; and a laser control module configured to, during each predetermined period: when a temperature of the LCoS panel is less than a predetermined temperature: apply power to the laser for a second predetermined ON period while power is applied to the LCoS panel and after the modulator control module begins applying power to the LCoS panel, where the second predetermined ON period is less than the first predetermined ON period; and disconnect the laser from power for the remainder of the predetermined period.

In further features, the laser control module is further configured to, during each predetermined period, when the temperature of the LCoS panel is greater than the predetermined temperature: apply power to the laser for the first predetermined ON period while power is applied to the LCoS panel; and disconnect the laser from power for the remainder of the predetermined period.

In further features, the second predetermined ON period is one half of the first predetermined ON period.

In further features, the second predetermined ON period ends when the first predetermined ON period ends.

In further features: the LCoS panel includes a heater; and the modulator control module is configured to apply power to the heater continuously when the temperature is less than a second predetermined temperature.

In further features, the second predetermined temperature is greater than the predetermined temperature.

In further features, the laser control module is further configured to: when the temperature of the LCoS panel is greater than the predetermined temperature, flow current of a first predetermined magnitude through the laser; and when the temperature of the LCoS panel is less than the predetermined temperature, flow current of a second predetermined magnitude through the laser, where the second predetermined magnitude is greater than the first predetermined magnitude.

In further features, the laser control module is configured to: determine a scalar value based on the temperature; and set the second predetermined magnitude based on the first predetermined magnitude divided by the scalar value.

In further features, the laser control module is configured to: determine a scalar value based on the temperature; and set the second predetermined ON period based on the scalar value and the first predetermined ON period.

In further features, the laser control module is configured to: set the second predetermined ON period based on the first predetermined ON period multiplied by the scalar value.

In further features, the laser control module is configured to: set the scalar value to less than 1.0 when the temperature is less than the predetermined temperature; and set the scalar value to 1.0 when the temperature is greater than the predetermined temperature.

In further features, the laser control module is configured to determine the scalar value using one of: (a) an equation that relates temperatures to scalar values; and (b) a lookup table that relates temperatures to scalar values.

In a feature, a head up display (HUD) method includes: modulating light output by a laser using a liquid crystal on silicon (LCoS) panel; during each predetermined period: applying power to the LCoS panel for a first predetermined ON period; and disconnecting the LCoS panel from power for a remainder of the predetermined period; and during each predetermined period: when a temperature of the LCoS panel is less than a predetermined temperature: applying power to the laser for a second predetermined ON period while power is applied to the LCoS panel and after power begins to be applied to the LCoS panel, where the second predetermined ON period is less than the first predetermined ON period; and disconnecting the laser from power for the remainder of the predetermined period.

In further features the method further includes, during each predetermined period, when the temperature of the LCoS panel is greater than the predetermined temperature: applying power to the laser for the first predetermined ON period while power is applied to the LCoS panel; and disconnecting the laser from power for the remainder of the predetermined period.

In further features, the second predetermined ON period is one half of the first predetermined ON period.

In further features, the second predetermined ON period ends when the first predetermined ON period ends.

In further features, the method further includes: applying power to a heater of the LCoS panel continuously when the temperature is less than a second predetermined temperature.

In further features, the second predetermined temperature is greater than the predetermined temperature.

In further features the method further includes: when the temperature of the LCoS panel is greater than the predetermined temperature, flowing current of a first predetermined magnitude through the laser; and when the temperature of the LCoS panel is less than the predetermined temperature, flowing current of a second predetermined magnitude through the laser, where the second predetermined magnitude is greater than the first predetermined magnitude.

In further features, the method further includes: determining a scalar value based on the temperature; and setting the second predetermined magnitude based on the first predetermined magnitude divided by the scalar value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may also include a holographic head up display (HUD) that includes a liquid crystal on silicon (LCoS) spatial light modulator. The LCoS spatial light modulator modulates light output by a laser before the light is output for view by a driver. The HUD system may include multiple lasers and multiple LCoS spatial light modulators.

LCoS spatial light modulators take time to achieve a target orientation of liquid crystal material after power is applied. The period to achieve the target orientation may increase as a temperature of the liquid crystal material decreases and vice versa. When a temperature of the liquid crystal material is less than a predetermined temperature and a laser is outputting light, a holographic image produced may appear blurry while the liquid crystal material moves to the target orientation.

The present application involves flowing current through a laser for only a portion (e.g., the second half) of the period that power is applied to the LCoS spatial light modulator when the temperature is less than the predetermined temperature. This allows the liquid crystal material to properly orient and decreases blurriness of the holographic image produced.

Additionally, a magnitude of current through the laser may be increased (e.g., doubled) when the temperature is less than the predetermined temperature. Increasing the current through the laser may minimize any decrease in luminance associated with flowing current through the laser for only the portion of the period that power is applied to the LCoS spatial light modulator.

Figure 1:
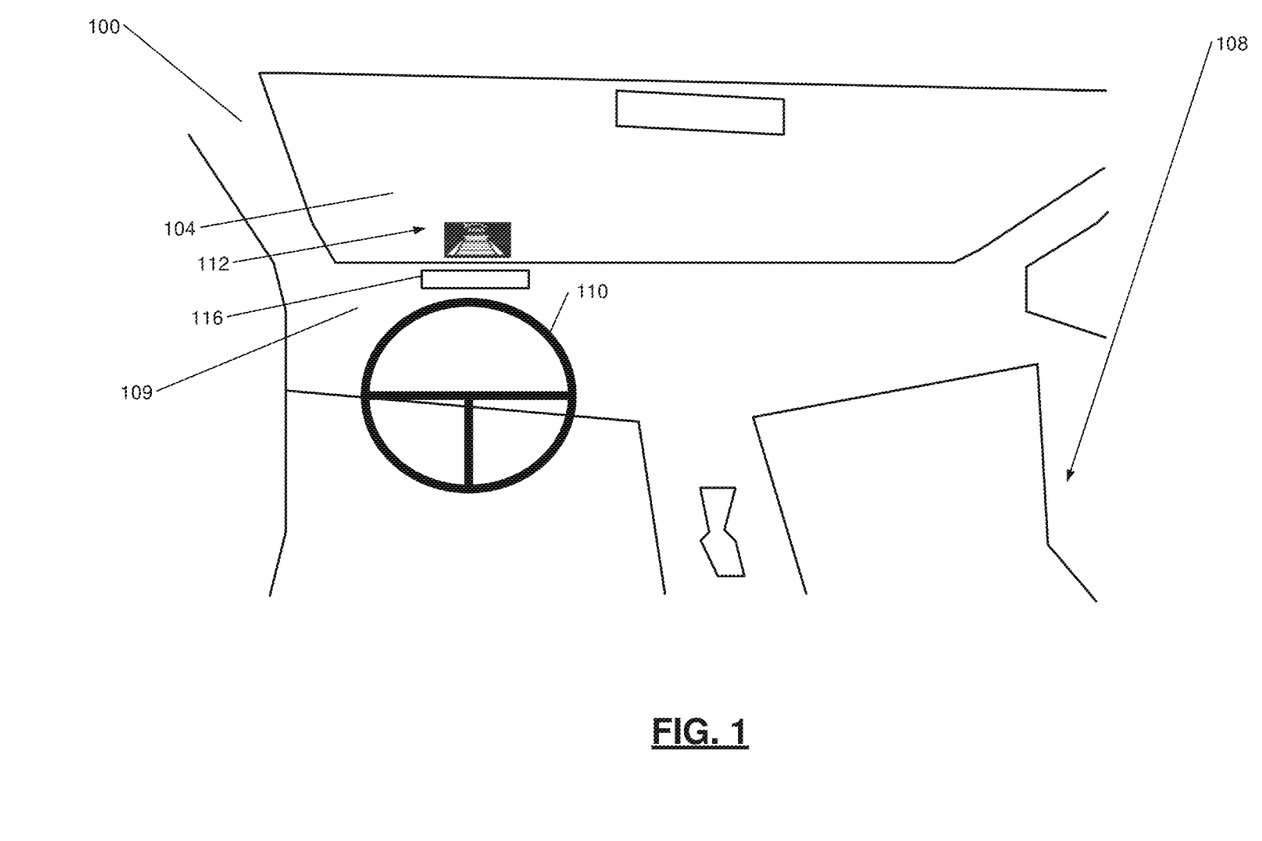
FIG. 1 includes an example perspective view from a driver seat of a vehicle 100.

FIG. 1 includes an example perspective view from a driver seat of a vehicle 100. The vehicle 100 includes a windshield 104 located in a front opening of the vehicle 100.

Passengers within a passenger cabin 108 of the vehicle 100 can look through the windshield 104 to see in front of the vehicle 100. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations including a HUD.

As shown in FIG. 1, the windshield 104 is visually located above a dashboard 109 of the vehicle 100. The vehicle 100 may include a steering wheel 110. The vehicle 100 may be an autonomous vehicle, a semi-autonomous vehicle, or a non-autonomous vehicle. In autonomous vehicles, the steering wheel 110 may be omitted.

A head up display (HUD) system 200 as discussed further below projects a hologram 112 onto a portion of the windshield 104 through an aperture 116 in the dashboard 109. While the example of a hologram is provided and will be discussed, the HUD system 200 may display images, graphics, etc. The hologram 112 includes various vehicle information, such as a present speed of the vehicle 100, a present gear of a transmission of the vehicle 100, an engine speed, a directional heading of the vehicle 100, present infotainment system settings, and/or other vehicle information. The hologram 112 presents data to the driver of the vehicle without the driver having to look away from objects in front of the vehicle.

Figure 2:
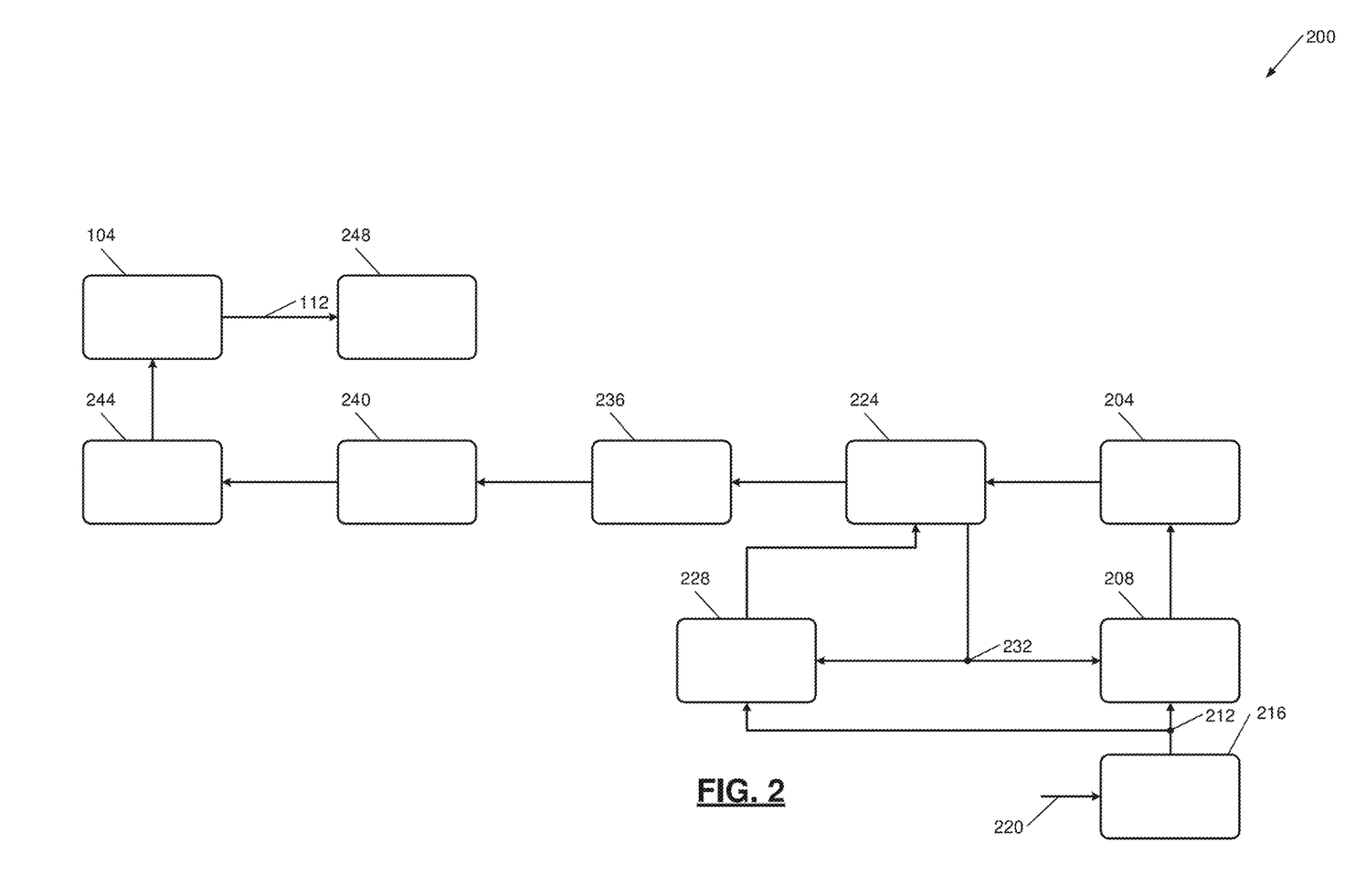
FIG. 2 includes an example implementation of a head up display (HUD) system.

FIG. 2 includes an example implementation of the HUD system 200. The HUD system 200 includes lasers 204, such as a laser that outputs red light, a laser that outputs green light, and a laser that outputs blue light. A laser control module 208 controls a duty cycle of signals applied to the lasers 204 and current to the lasers 204 based on a target hologram 212 to be projected onto the windshield 104.

A HUD control module 216 generates the target hologram 212 based on vehicle data 220. The HUD control module 216 may obtain the vehicle data 220, for example, from a communication bus of the vehicle 100. The vehicle data 220 may include, for example, the present speed of the vehicle 100, the present gear of the transmission of the vehicle 100, the present engine speed, the present directional heading of the vehicle 100, the present infotainment system settings, and/or the other vehicle information.

The spatial light modulators 224 modulate light output from the lasers 204, respectively. The spatial light modulators 224 include liquid crystal on silicon (LCoS) panels. A modulator control module 228 applies power to the spatial light modulators 224 at a predetermined duty cycle and based on the target hologram 212. For example, the modulator control module 228 may apply power to the spatial light modulators 224 for a first predetermined period then disconnect the spatial light modulators 224 from power for a second predetermined period. The modulator control module 228 may then apply power to the spatial light modulators 224 for the first predetermined period. The first predetermined period and the second predetermined period together define a predetermined period of the predetermined duty cycle.

The spatial light modulators 224 encode phase holograms for holographic projection. The viscosity of the liquid crystal fluid or material, however, varies with temperature. As a result, a response time of the spatial light modulators 224 to reach a predetermined liquid crystal orientation may vary with temperature.

Figure 3A:
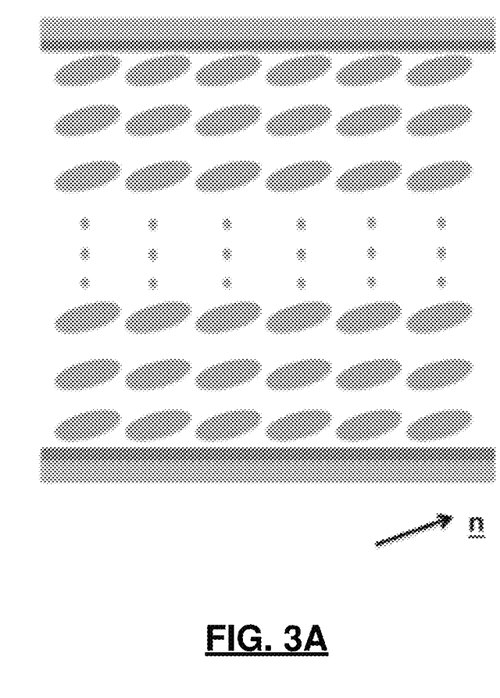
FIGS. 3A and 3B include example illustrations of orientations of liquid crystal material.
Figure 3B:
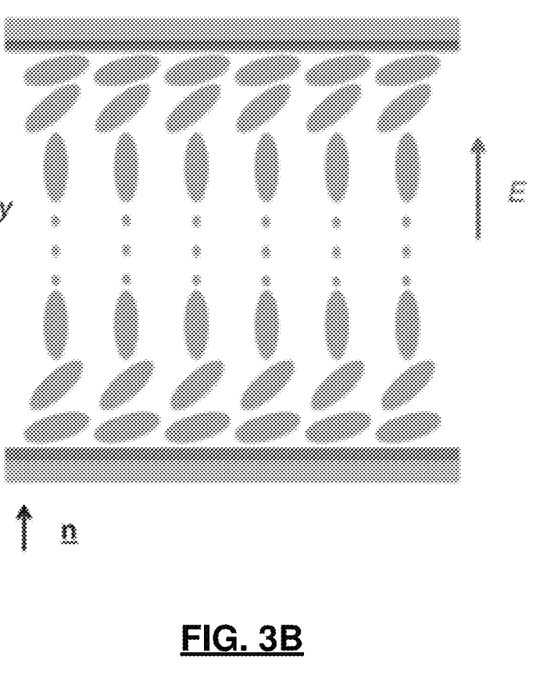

FIGS. 3A and 3B include example illustrations including orientations of the liquid crystal material of a spatial light modulator. FIG. 3A includes an example illustration of the orientations of the liquid crystal material when the spatial light modulator is off and disconnected from power. FIG. 3B includes an example illustration of the orientations of the liquid crystal material when the spatial light modulator is on and connected to power for a sufficient period (e.g., the first predetermined period when the temperature of the spatial light modulator is greater than a predetermined blur temperature).

Figure 4:
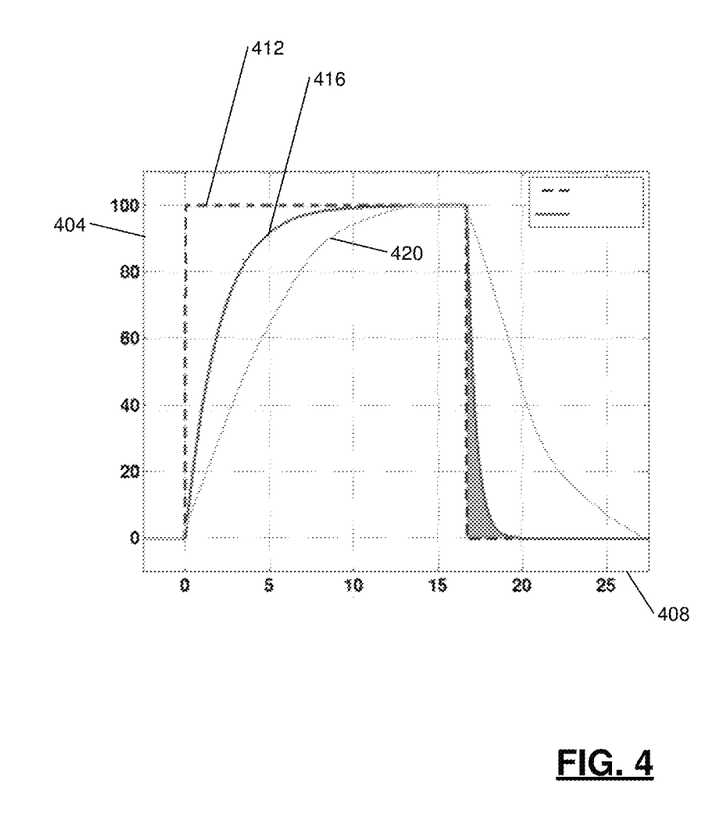
FIG. 4 illustrates an example graph of luminance 404 from a laser via a spatial light modulator including a liquid crystal on silicon (LCoS) panel over time at various temperatures.

FIG. 4 illustrates an example graph of luminance 404 (e.g., percentage of a maximum luminance) from a laser via a spatial light modulator over time 408 at various temperatures of the spatial light modulator. Power is applied to the laser and the spatial light modulator at time 0.

Trace 412 illustrates a target (desired) response to the application of power. Trace 416 illustrates a response to the application of power when a temperature of the spatial light modulator is a higher temperature (a first temperature). Trace 420 illustrates a response to the application of power when a temperature of the spatial light modulator is a lower temperature (a second temperature).

As illustrated, the luminance increases to a maximum more slowly when the temperature is lower and decreases more slowly when the temperature is lower. This is because the liquid crystal material of the spatial light modulator takes a longer period to reach a target orientation (e.g., FIG. 3B) after power is applied and takes a longer period to return to a resting state (e.g., FIG. 3A) after power is disconnected. The low temperature may cause the hologram generated by the HUD system 200 to appear blurry.

Referring again to FIG. 2, according to the present disclosure, the laser control module 208 adjusts the duty cycle of the lasers 204 based on temperatures 232 of the spatial light modulators 224 (and more particularly of the liquid crystal material), respectively. For example, the laser control module 208 may adjust a pulse of a laser to overlap with half of the ON period of the predetermined duty cycle of the spatial light modulator. This may decrease blur associated with the low temperature of the spatial light modulator. Additionally, the laser control module 208 may increase a magnitude of current (e.g., to two times a predetermined current) of the pulse when the temperature of the spatial light modulator is less than the predetermined blur temperature. Increasing the magnitude of the current pulse may compensate for any loss in luminance due to using a duty cycle that is less than the predetermined duty cycle.

The modulator control module 228 may also control application of power to heaters of the spatial light modulators 224, respectively. The modulator control module 228 may apply power to the heater of a spatial light modulator when the temperature of that spatial light modulator is less than a predetermined temperature (later referred to as a predetermined IQ temperature). The heaters may warm the spatial light modulators when the heaters are on, respectively.

A lens 236 (e.g., an x cube or pyramidal lens) may combine the light output from the lasers 204 through the spatial light modulators 224, respectively. A diffuser 240 may diffuse light output from the lens 236. A mirror 244 or another suitable type of reflector may reflect light output from the diffuser 240 onto the windshield 104. The windshield 104 reflects light into an eyebox 248 through which light from the HUD is visible by a driver of the vehicle 100.

Figure 5:
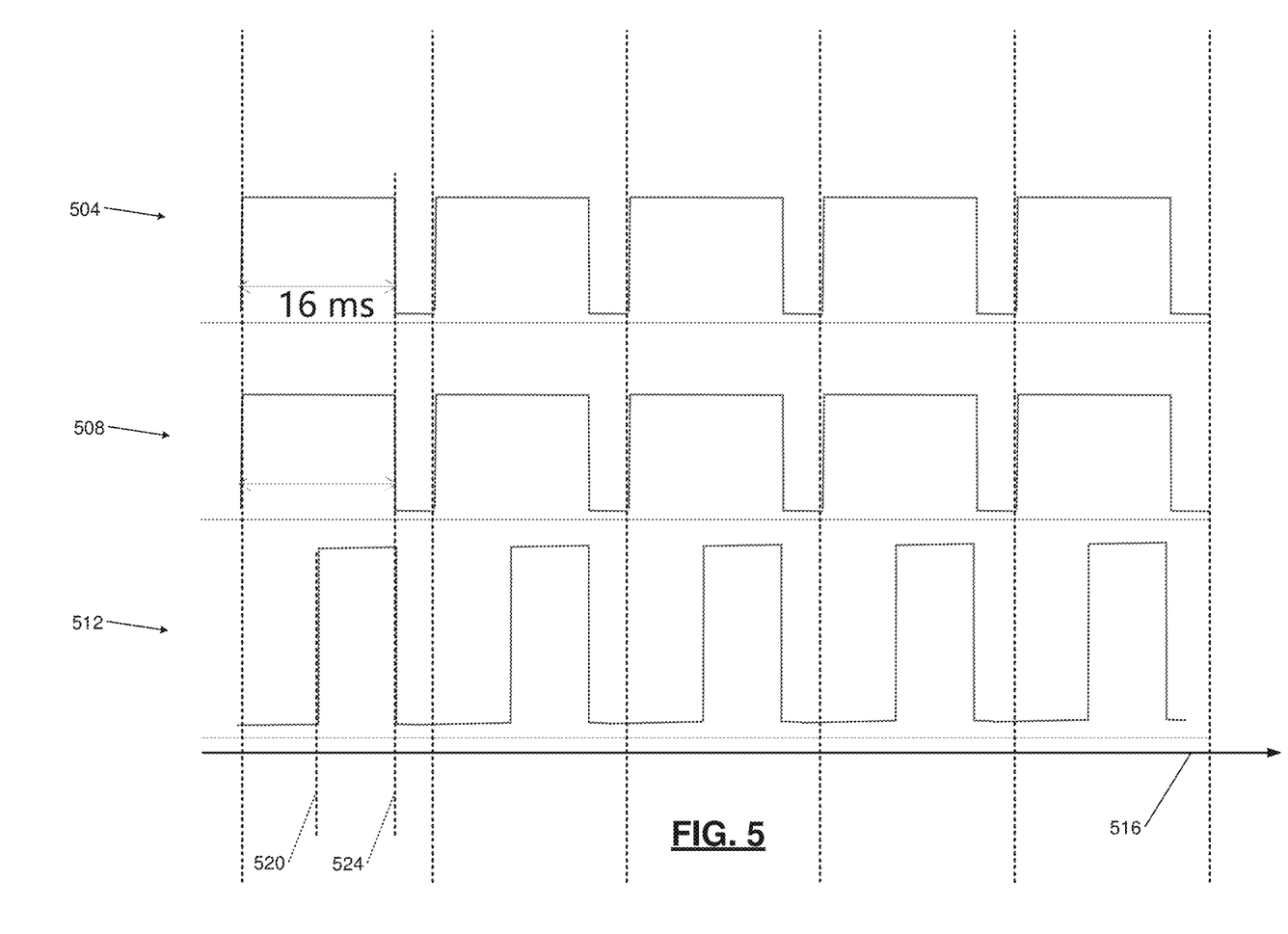
FIG. 5 includes example graphs of voltage input to a spatial light modulator and currents over time.

FIG. 5 includes an example graph of voltage input 504 to a spatial light modulator over time 516, current 508 through a laser of the spatial light modulator over time 516 when the temperature of the spatial light modulator is not less than a predetermined blur temperature, and current 512 through the laser of the spatial light modulator over time 516 when the temperature of the spatial light modulator is less than the predetermined blur temperature. Image blur due to low temperature may be noticeable at temperatures below the predetermined blur temperature.

As illustrated, the modulator control module 228 applies power to the spatial light modulator at a predetermined duty cycle over each predetermined period. Using duty cycle control, power is applied to the spatial light modulator continuously for a predetermined ON period of each predetermined period, and power is not applied to the spatial light modulator continuously for a remainder (a predetermined OFF period) of each predetermined period. The predetermined period is illustrated in FIG. 5 between the vertical dashed lines.

When the temperature of the spatial light modulator is greater than the predetermined blur temperature, the laser control module 208 applies power to the laser (associated with the spatial light modulator) at the predetermined duty cycle over each predetermined period the same as power is applied to the spatial light modulator. Using duty cycle control, power is applied to the laser continuously for the predetermined ON period of the predetermined period, and power is not applied to the spatial light modulator for a remainder (the predetermined OFF period) of the predetermined period. The predetermined ON period of the laser occurs at the same time as the predetermined ON period of the spatial light modulator. The predetermined OFF period of the laser occurs at the same time as the predetermined OFF period of the spatial light modulator.

When the temperature of the spatial light modulator is less than the predetermined blur temperature, the laser control module 208 applies power to the laser (associated with the spatial light modulator) at less than the predetermined duty cycle over each predetermined period. In the example of FIG. 5, the laser control module 208 may apply power to the laser at one-half of the predetermined duty cycle over each predetermined period. Using duty cycle control, power is applied to the laser continuously for one half of the predetermined ON period of the predetermined period, and power is not applied to the spatial light modulator for a remainder (the predetermined OFF period+one half of the predetermined ON period) of the predetermined period. When the temperature of the spatial light modulator is less than the predetermined blur temperature, the ON period of the laser begins after the predetermined ON period of the spatial light modulator (e.g., see 520) begins and ends at the same time as the predetermined ON period of the spatial light modulator ends (e.g., see 524). In this manner, the ON period of the laser may be the last one-half of the predetermined ON period of the spatial light modulator. This may decrease blurriness of the hologram generated by the HUD system.

In other words, the laser (ON) pulse is synchronized with the application of power to the spatial light modulator. The duty cycle of the laser pulse is decreased when the temperature of the spatial light modulator is less than the predetermined blur temperature, and the beginning of the ON pulse of the laser is delayed relative to when the temperature is greater than the predetermined blur temperature. Delaying the beginning of the ON pulse of the laser aligns the light pulse of the laser with stable alignment of the liquid crystal material of the spatial light modulator.

While the example of one-half of the predetermined ON period is discussed, the present application is also applicable to using other fractions of the predetermined ON period when the temperature is less than the predetermined blur temperature.

For example, the laser control module 208 may determine a scalar value (e.g., 0.0-1.0) for the duty cycle to apply to the predetermined ON period based on the temperature of the spatial light modulator. The laser control module 208 may set the scalar value, for example, using one of an equation and a lookup table that relates temperatures to scalar values. The scalar value may be 1 when the temperature is greater than the predetermined blur temperature. The scalar value may decrease (toward 0) as the temperature decreases and may increase (toward 1) as the temperature increases toward the predetermined blur temperature. The laser control module 208 may set the ON period for the laser, for example, based on or equal to the scalar value multiplied by the predetermined ON period.

As discussed above, when the temperature of the spatial light modulator is less than the predetermined blur temperature, the laser control module 208 may also increase a magnitude of current through the laser. For example, the laser control module 208 may apply a predetermined magnitude of current through the laser when the temperature of the spatial light modulator is greater than the predetermined blur temperature. The laser control module 208 may flow two times the predetermined magnitude of current through the laser when the temperature of the spatial light modulator is less than the predetermined blur temperature. The greater magnitude of current may minimize or offset any decrease in luminance associated with using the shorter ON period when the temperature of the spatial light modulator is less than the predetermined blur temperature. In various implementations, the laser control module 208 may set the magnitude of current through the laser based on or equal to the predetermined magnitude divided by the scalar value.

Figure 6:
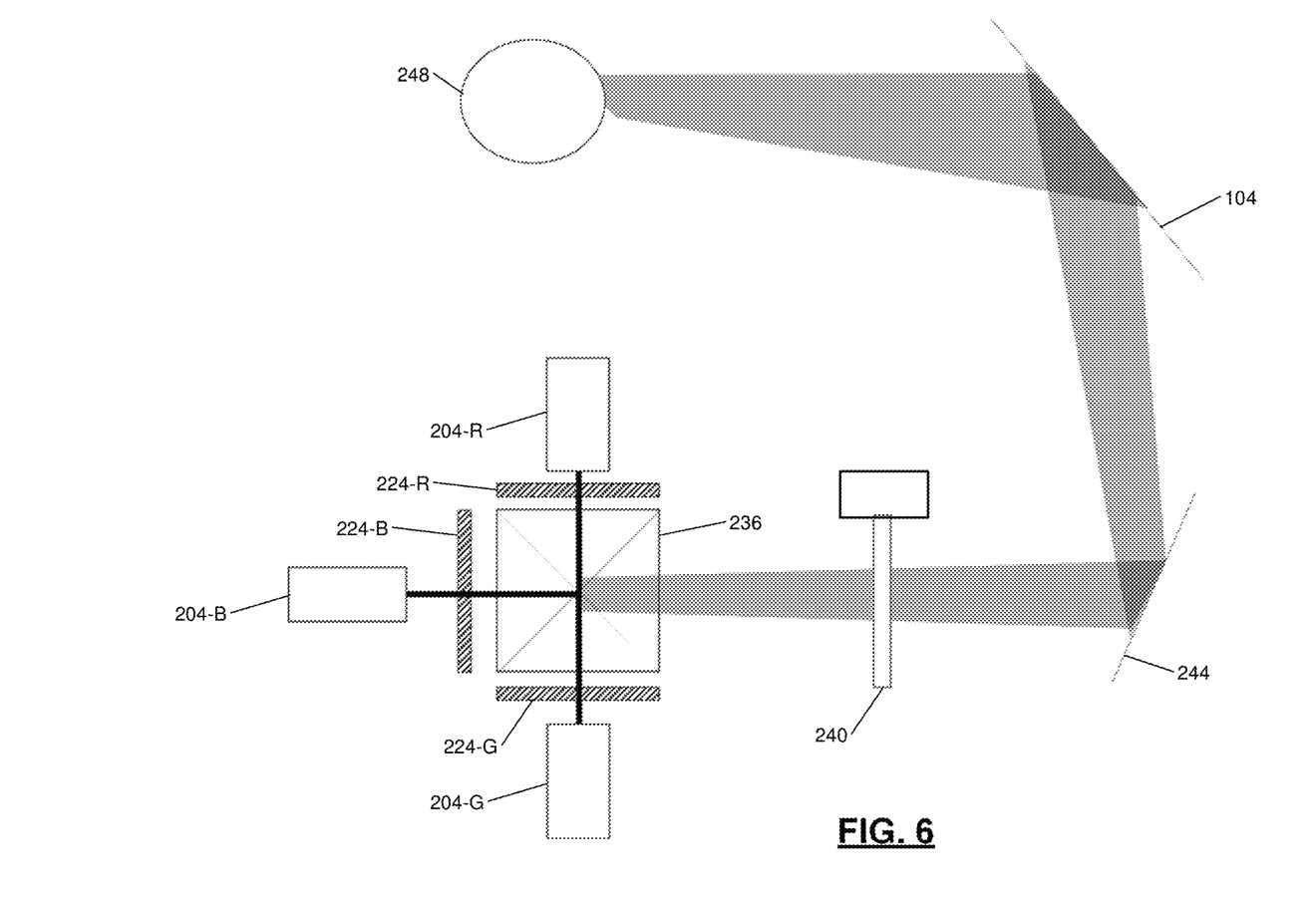
FIG. 6 is another functional block diagram of the HUD system of FIG. 2.

FIG. 6 is another functional block diagram of the HUD system 200 of FIG. 2. The HUD system 200 may include a red laser 204-R that outputs red light and a red spatial light modulator 224-R that modulates light output from the red laser 204-R. The red spatial light modulator 224-R includes a LCoS panel. A blue laser 204-B outputs blue light, and a blue spatial light modulator 224-B modulates light output from the blue laser 204-B. The blue spatial light modulator 224-B includes a LCoS panel. A green laser 204-G outputs green light, and a green spatial light modulator 224-G modulates light output from the green laser 204-G. The green spatial light modulator 224-G includes a LCoS panel.

The laser control described herein is applicable to one, two, or all of the red laser 204-R based on a temperature of the red spatial light modulator 224-R, the blue laser 204-B based on a temperature of the blue spatial light modulator 224-B, and the green laser 204-G based on a temperature of the green spatial light modulator 224-G.

Figure 7:
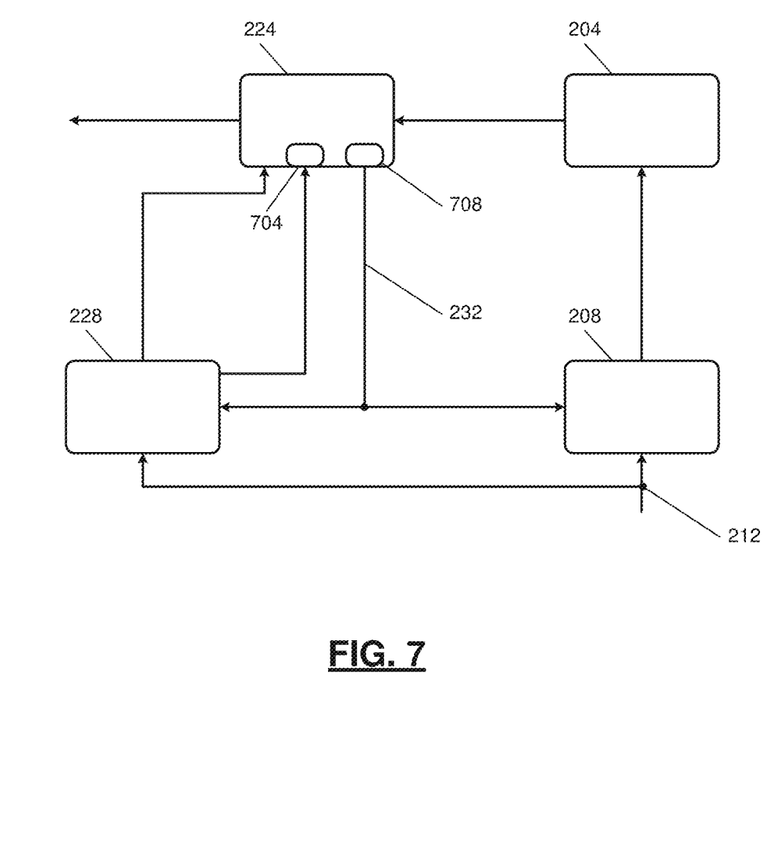
FIG. 7 is a functional block diagram of a portion of FIG. 2 including one of laser and one spatial light modulator.

FIG. 7 is a functional block diagram of a portion of FIG. 2 including one of the lasers 204 and one of the spatial light modulators 224. The spatial light modulator 224 includes a heater 704, such as a resistive heater or another suitable type of electric heater that generates heat when power is applied to the heater 704. The heater 704 warms the spatial light modulator 224 (and the liquid crystal material) when the heater 704 is on. The spatial light modulator 224 also includes a temperature sensor 708 that measures a temperature 232 of the spatial light modulator 224 (e.g., the liquid crystal material/fluid).

The modulator control module 228 may apply power to the heater 704 when the temperature 232 of the spatial light modulator 224 is less than the predetermined IQ temperature. The modulator control module 228 may not apply power to the heater 704 of a spatial light modulator when the temperature of that spatial light modulator 224 is greater than the predetermined image quality temperature. The heater 704 may warm the spatial light modulator when the heater 704 is on. The predetermined IQ temperature may be greater than the predetermined blur temperature.

Figure 8:
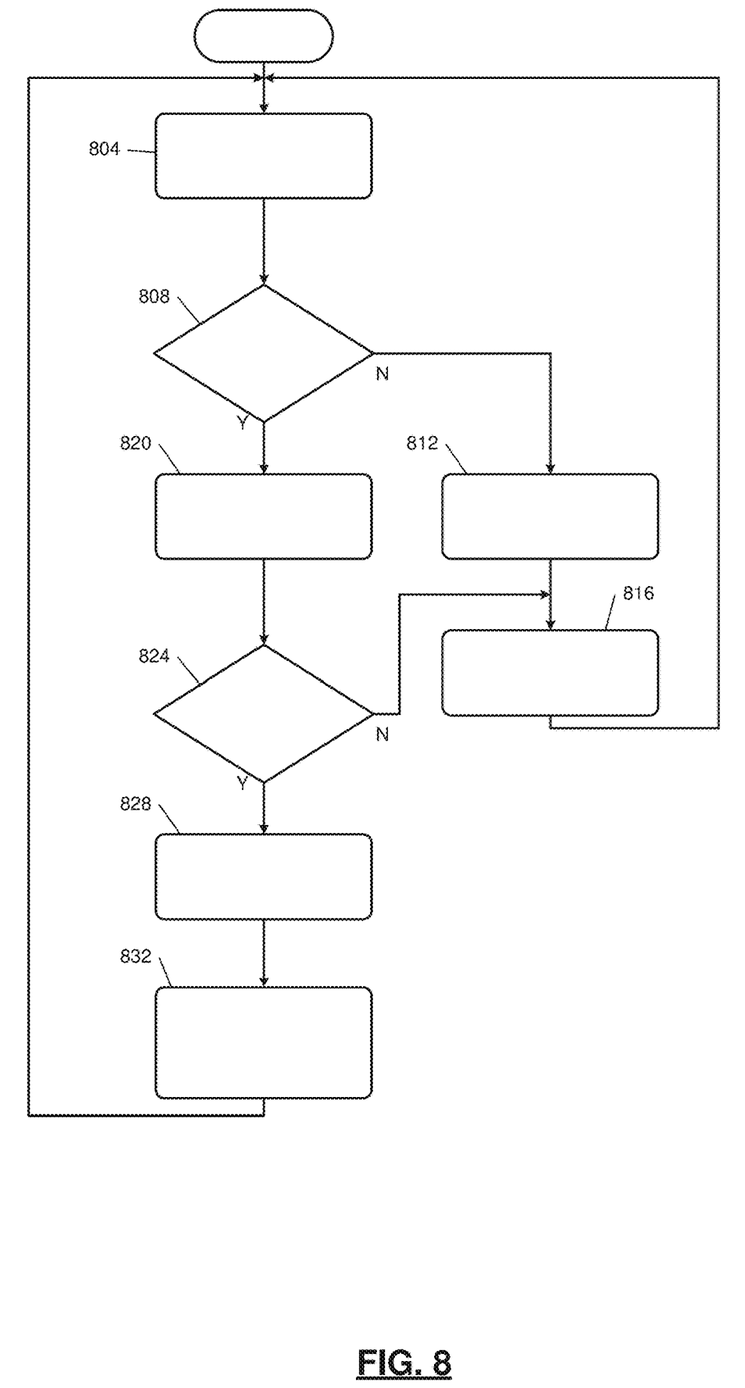
FIG. 8 is a flowchart depicting an example method of controlling a laser of a HUD system that outputs light via a spatial light modulator including an LCoS panel.

FIG. 8 is a flowchart depicting an example method of controlling a laser of a HUD system that outputs light via a spatial light modulator including an LCoS panel. Control begins with 804 where the laser control module 208 and the modulator control module 228 receives the temperature 232 of the spatial light modulator 224 (including an LCoS panel/device) that modulates light output by the laser 204.

At 808, the modulator control module 228 determines whether the temperature 232 of the spatial light modulator 224 is less than the predetermined IQ temperature. The hologram produced by the HUD system may have less than a predetermined image quality when the temperature 232 is less than the predetermined IQ temperature. The predetermined IQ temperature may be, for example, approximately 40 degrees Celsius or another suitable temperature. If 808 is false, control may continue with 812 and 816. If 808 is true, control may continue with 820.

At 812, the modulator control module 228 may turn or maintain the heater 704 OFF. At 816, the modulator control module 228 applies power to the spatial light modulator 224 at the predetermined duty cycle. The predetermined duty cycle may include, for example, the predetermined ON period of 16 milliseconds (ms) during the predetermined period or another suitable ON period and the predetermined OFF period of 4 ms or another suitable OFF period during the predetermined period. Also at 816, the laser control module 208 applies power to the laser 204 at the predetermined duty cycle and the predetermined magnitude of current. Control returns to 804 for a next predetermined period.

At 820, the modulator control module 228 turns or maintains the heater 704 ON to warm the spatial light modulator 224. At 824, the laser control module 208 determines whether the temperature 232 is less than the predetermined blur temperature. The predetermined blur temperature may be less than the predetermined IQ temperature. The predetermined blur temperature may be, for example, approximately 20 degrees Celsius or another suitable temperature. The predetermined blur temperature and the predetermined IQ temperature may be calibrated, such as during design. If 824 is false, control transfers to 816. If 824 is true, control continues with 828.

At 828, the laser control module 208 may determine a scalar value for adjusting the ON period of the laser 204 and the duty cycle. In various implementations, scalar value may be a fixed predetermined value, such as 0.5 (one half). In other implementations, the laser control module 208 may set the scalar value based on the temperature 232. For example, the laser control module 208 may decrease the scalar value (toward 0) as the temperature 232 decreases and increase the scalar value (toward 1) as the temperature 232 increases toward the predetermined blur temperature. The laser control module 208 may determine the scalar value using, for example, an equation or a lookup table that relates temperatures to scalar values.

At 832, the laser control module 208 applies power to the laser 204 at a duty cycle corresponding to the scalar value multiplied by the predetermined duty cycle. More specifically, the laser control module 208 applies power to the laser 204 for an ON period corresponding to the predetermined ON period multiplied by the scalar value. The laser control module 208 begins the ON period of the laser 204 after the modulator control module 228 begins the ON period of the spatial light modulator 224 such that the ON periods of the laser 204 and the spatial light modulator 224 overlap for the entirety of the ON period of the laser 204. The laser control module 208 ends the ON period of the laser 204 at the same time as the modulator control module 228 ends the ON period of the spatial light modulator 224. Also at 832, during the ON period of the laser, the laser control module 208 applies power to the laser 204 at twice (2×) the predetermined magnitude of current in the example of using half of the ON period. More generally, the laser control module 208 may flow current through the laser 204 based on the predetermined magnitude divided by the scalar value. This offsets any decrease in luminance associated with the use of the shorter ON period of the laser 204. Control returns to 804 for a next predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A head up display (HUD) system comprising:
a laser;
a liquid crystal on silicon (LCoS) panel configured to modulate light output by the laser;
a modulator control module configured to, during each predetermined period:
apply power to the LCoS panel for a first predetermined ON period; and
disconnect the LCoS panel from power for a remainder of the predetermined period; and
a laser control module configured to, during each predetermined period:
when a temperature of the LCoS panel is less than a predetermined temperature:
apply power to the laser for a second predetermined ON period while power is applied to the LCoS panel and after the modulator control module begins applying power to the LCoS panel,
wherein the second predetermined ON period is less than the first predetermined ON period; and
disconnect the laser from power for the remainder of the predetermined period.

2. The HUD system of claim 1 wherein the laser control module is further configured to, during each predetermined period, when the temperature of the LCoS panel is greater than the predetermined temperature:
apply power to the laser for the first predetermined ON period while power is applied to the LCoS panel; and
disconnect the laser from power for the remainder of the predetermined period.

3. The HUD system of claim 1 wherein the second predetermined ON period is one half of the first predetermined ON period.

4. The HUD system of claim 1 wherein the second predetermined ON period ends when the first predetermined ON period ends.

5. The HUD system of claim 1 wherein:
the LCoS panel includes a heater; and
the modulator control module is configured to apply power to the heater continuously when the temperature is less than a second predetermined temperature.

6. The HUD system of claim 5 wherein the second predetermined temperature is greater than the predetermined temperature.

7. The HUD system of claim 1 wherein the laser control module is further configured to:
when the temperature of the LCoS panel is greater than the predetermined temperature, flow current of a first predetermined magnitude through the laser; and
when the temperature of the LCoS panel is less than the predetermined temperature, flow current of a second predetermined magnitude through the laser,
wherein the second predetermined magnitude is greater than the first predetermined magnitude.

8. The HUD system of claim 7 wherein the laser control module is configured to:
determine a scalar value based on the temperature; and
set the second predetermined magnitude based on the first predetermined magnitude divided by the scalar value.

9. The HUD system of claim 1 wherein the laser control module is configured to:
determine a scalar value based on the temperature; and
set the second predetermined ON period based on the scalar value and the first predetermined ON period.

10. The HUD system of claim 9 wherein the laser control module is configured to:
set the second predetermined ON period based on the first predetermined ON period multiplied by the scalar value.

11. The HUD system of claim 9 wherein the laser control module is configured to:
set the scalar value to less than 1.0 when the temperature is less than the predetermined temperature; and
set the scalar value to 1.0 when the temperature is greater than the predetermined temperature.

12. The HUD system of claim 9 wherein the laser control module is configured to determine the scalar value using one of: (a) an equation that relates temperatures to scalar values; and (b) a lookup table that relates temperatures to scalar values.

13. A head up display (HUD) method, comprising:
modulating light output by a laser using a liquid crystal on silicon (LCoS) panel;
during each predetermined period:
applying power to the LCoS panel for a first predetermined ON period; and
disconnecting the LCoS panel from power for a remainder of the predetermined period; and
during each predetermined period:
when a temperature of the LCoS panel is less than a predetermined temperature:
applying power to the laser for a second predetermined ON period while power is applied to the LCoS panel and after power begins to be applied to the LCoS panel,
wherein the second predetermined ON period is less than the first predetermined ON period; and
disconnecting the laser from power for the remainder of the predetermined period.

14. The HUD method of claim 13 further comprising, during each predetermined period, when the temperature of the LCoS panel is greater than the predetermined temperature:
   applying power to the laser for the first predetermined ON period while power is applied to the LCoS panel; and
   disconnecting the laser from power for the remainder of the predetermined period.

15. The HUD method of claim 13 wherein the second predetermined ON period is one half of the first predetermined ON period.

16. The HUD method of claim 13 wherein the second predetermined ON period ends when the first predetermined ON period ends.

17. The HUD method of claim 13 further comprising:
   applying power to a heater of the LCoS panel continuously when the temperature is less than a second predetermined temperature.

18. The HUD method of claim 17 wherein the second predetermined temperature is greater than the predetermined temperature.

19. The HUD method of claim 13 further comprising:
   when the temperature of the LCoS panel is greater than the predetermined temperature, flowing current of a first predetermined magnitude through the laser; and
   when the temperature of the LCoS panel is less than the predetermined temperature, flowing current of a second predetermined magnitude through the laser,
   wherein the second predetermined magnitude is greater than the first predetermined magnitude.

20. The HUD method of claim 19 further comprising:
   determining a scalar value based on the temperature; and
   setting the second predetermined magnitude based on the first predetermined magnitude divided by the scalar value.

* * * * *